Figure 1:
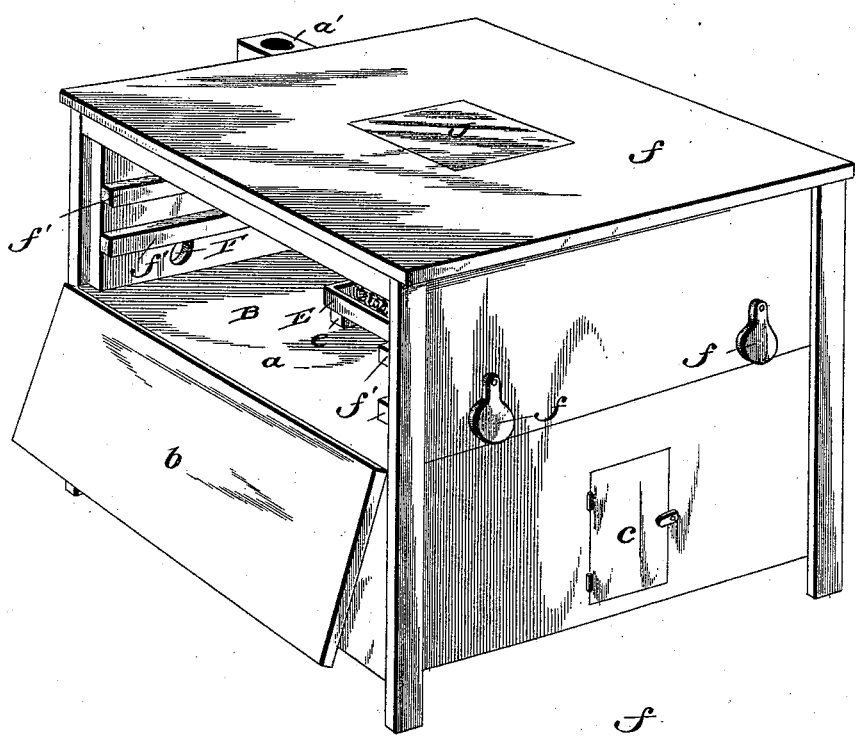

(No Model.)  2 Sheets—Sheet 1.

D. WHEAT.
INCUBATOR.

No. 492,079.  Patented Feb. 21, 1893.

Witnesses:

Inventor:
David Wheat.
By William O. Belt.
Atty.

(No Model.)  D. WHEAT.  2 Sheets—Sheet 2.
INCUBATOR.

No. 492,079. Patented Feb. 21, 1893.

Witnesses:

Inventor:
David Wheat,
By William O. Belt.
Atty.

UNITED STATES PATENT OFFICE.

DAVID WHEAT, OF KENT, INDIANA.

INCUBATOR.

SPECIFICATION forming part of Letters Patent No. 492,079, dated February 21, 1893.

Application filed May 18, 1892. Serial No. 433,461. (No model.)

*To all whom it may concern:*

Be it known that I, DAVID WHEAT, a citizen of the United States, residing at Kent, in the county of Jefferson and State of Indiana, have invented certain new and useful Improvements in Incubators; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to incubators, and its object is to simplify the construction so that an effective device can be manufactured at reduced expense; and a further object is to provide novel devices for diffusing the heat throughout the incubator and means for properly holding and agitating the eggs.

With these and other ends in view the invention consists of a structure divided into a heating and an incubating chamber by a zinc plate, a pan containing sand or other suitable material hung from said plate over a lamp placed in the heating chamber, a pan holding a moistened sponge which rests on the zinc plate in the incubating chamber, and an egg drawer arranged to slide on cleats in the incubating chamber.

My invention consists further of certain details of construction and arrangement of parts which will be fully pointed out and claimed hereinafter.

Figure 2:
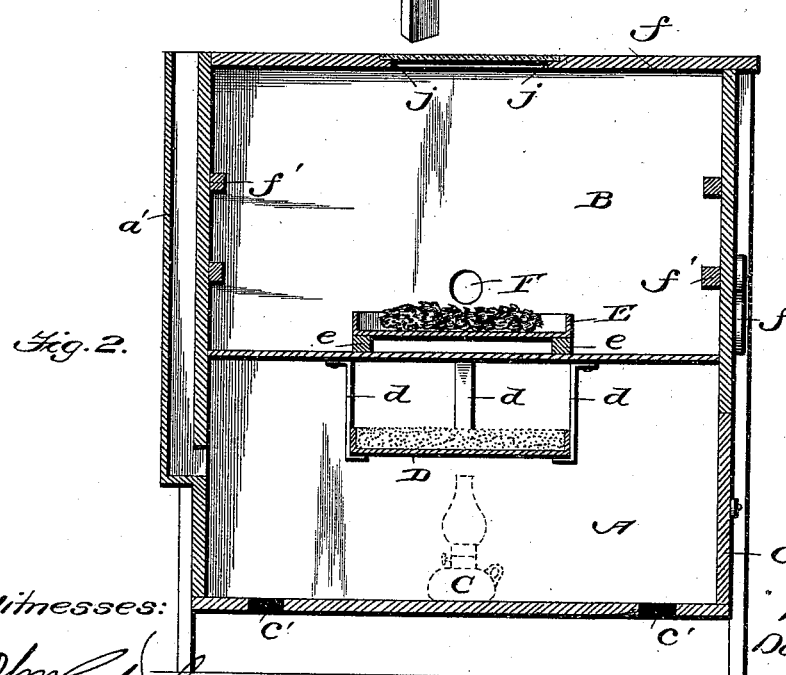
Figure 3:
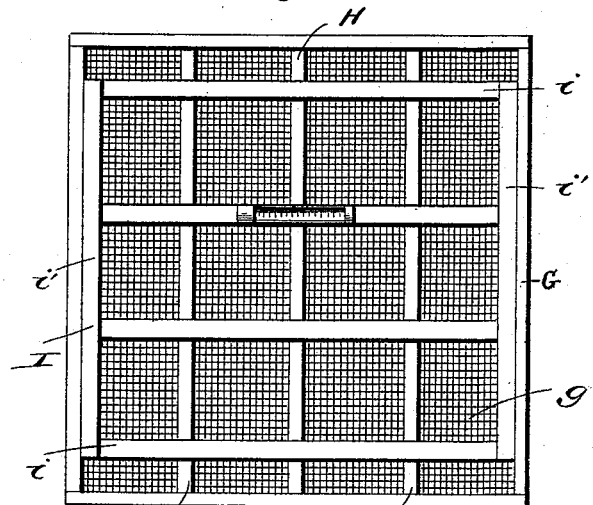
Figure 4:
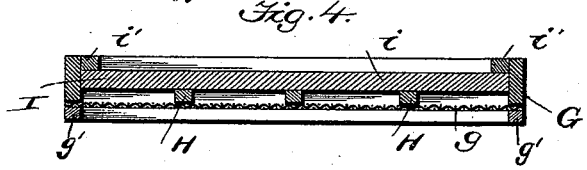
Figure 5:
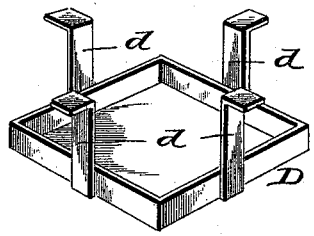
Figure 6:
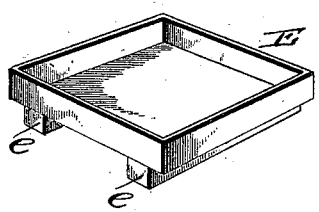

To enable others to more readily understand the invention, I have illustrated the same in the accompanying drawings forming a part of this application, in which, Figure 1 is a perspective view of my improved incubator showing the interior arrangement thereof with the egg drawer removed. Fig. 2 is a vertical central sectional view. Fig. 3 is a plan view of the egg drawer and rack. Fig. 4 is a sectional view through the same. Fig. 5 is a detail view of the hanging pan in the heating chamber, and Fig. 6 is a detail view of the sponge pan.

Referring to the drawings, in which like letters of reference denote corresponding parts in all the figures, A designates the heating chamber, and B the incubating chamber which is arranged above the heating chamber and is separated therefrom by a zinc plate $a$ which forms the top of the heating chamber and the bottom of the incubating chamber, respectively.

A lamp C or other desirable source of heat, is placed in the heating chamber, which is provided with a door $c$ at one side and draft holes $c'$ in the bottom.

The zinc plate $a$ will become heated very rapidly and to prevent it from getting too hot in the middle, directly over the lamp, and also to diffuse the heat throughout the heating chamber, I provide a pan D which is supported on hangers $d$ suitably secured to the under side of said plate. This pan is filled with sand or some other suitable material, which will absorb the heat and prevent it from acting directly with its greatest intensity upon the plate $a$, and at the same time scatter the heat around to other parts of the heating chamber. The natural tendency of the greatest heat would be to rise directly from the lamp and this would cause the plate to become exceedingly hot at its middle while the sides would remain cool; but the pan D throws the heat off to the sides where it will act on all parts of the plate with equal effect and intensity.

A smoke chimney $a'$ is arranged on the outside of the incubator and it communicates with the heating chamber to convey away the smoke from the lamp so that it may not in any manner enter the incubating chamber.

The incubating chamber B is of substantially the same size as the heating chamber, although the relative sizes of these chambers may be varied as deemed advisable, and said incubating chamber is provided with a door $b$ on one side thereof through which the egg drawer is passed.

To provide a proper degree of moisture in the incubating chamber I employ a pan E which holds a moistened sponge and is placed inside of the incubating chamber on the plate $a$. This pan has two or more wooden strips $e$ or legs secured on its bottom which prevent said pan from coming in direct contact with said zinc plate and provide a suitable space between the pan and plate in which the heat may circulate. Besides containing the source of moisture this pan also assists in diffusing the heat throughout the incubating chamber so that it will not all accumulate in one place, and for this reason the pan is preferably placed in the middle of the plate $a$ which forms the bottom of the incubating chamber.

To ventilate the incubating chamber I also provide a number of holes F which are suitably located in the walls of said chamber, and they have slide valves $f$ of some preferred construction on the outside of the incubator whereby they may be readily opened and closed to admit more or less air into the incubating chamber, as required.

The egg drawer is arranged to slide on cleats $f'$ secured on the inside of the incubating chamber, and it consists of a primary frame G to which a bottom of wire gauze $g$ is secured and held in place by a supplemental frame $g'$ fastened to the main frame G in some suitable manner. Not only does the supplemental frame $g'$ hold the gauze bottom securely in place, but it protects the edges of the bottom and also provides a smooth bearing surface whereby the drawer can be readily moved in and out of the incubating chamber, sliding on the cleats $f'$ suitably arranged therein. This egg drawer is divided into a number of oblong compartments by strips H which extend entirely across the frame G and are secured thereto, so that when the drawer is placed within the incubating chamber these strips will extend in a direction running from the door to the opposite side of the chamber.

In order to agitate the eggs gently and thoroughly without breaking them, which is essential to good hatching, I provide a rack I which is arranged to fit inside the frame G and is adapted to be moved back and forth on the strips H. This rack is necessarily somewhat smaller than the egg drawer and it consists of a number of strips $i$ which are connected by end strips $i'$. When the rack is placed on the egg drawer the strips $i$ will run transversely across the strips H of the drawer, and this will divide said drawer into a number of small egg compartments, by sub-dividing the oblong compartments formed by the strips H in the egg drawer. The eggs are placed on the wire gauze bottom of the egg drawer, in the compartments formed by the strips H, $i$, and when it is desired to turn or agitate them, which is usually done at regular and stated intervals, the sliding rack I is simply moved back and forth across the drawer within the limited space provided thereby. The rack may be moved by hand after opening the door to the incubating chamber, or a short rod running through the incubating chamber wall may be attached to said rack and by which it can be easily and readily operated.

To ascertain the intensity of the heat in the incubating chamber, I place a thermometer in the egg drawer or sliding rack, and provide a glass plate J which is secured in seats $j$ around an opening in the top of the incubator, so that the thermometer may be readily observed without opening the incubator.

I am aware that changes in the form and proportion of parts and details of construction may be made without departing from the spirit or sacrificing the advantages of my invention, and I therefore reserve the right to make such changes as fairly fall within the scope of the invention.

Having thus fully described my invention, what I claim as new, and desire to secure by Letters Patent, is—

In an incubator having a heating and an incubating chamber, a metallic plate $a$ arranged between said chambers and extending across the incubator, a lamp arranged in the heating chamber, the hangers $d$ secured to the under side of the plate $a$ and extending down close to the lamp in the heating chamber, and a sand pan D supported by said hangers directly over the lamp whereby the heat from said lamp may circulate above the pan and is diffused throughout the heating chamber, substantially as described.

In testimony whereof I affix my signature in presence of two witnesses.

DAVID WHEAT.

Witnesses:
 W. H. LYLE,
 S. K. DEPUTY.